UNITED STATES PATENT OFFICE.

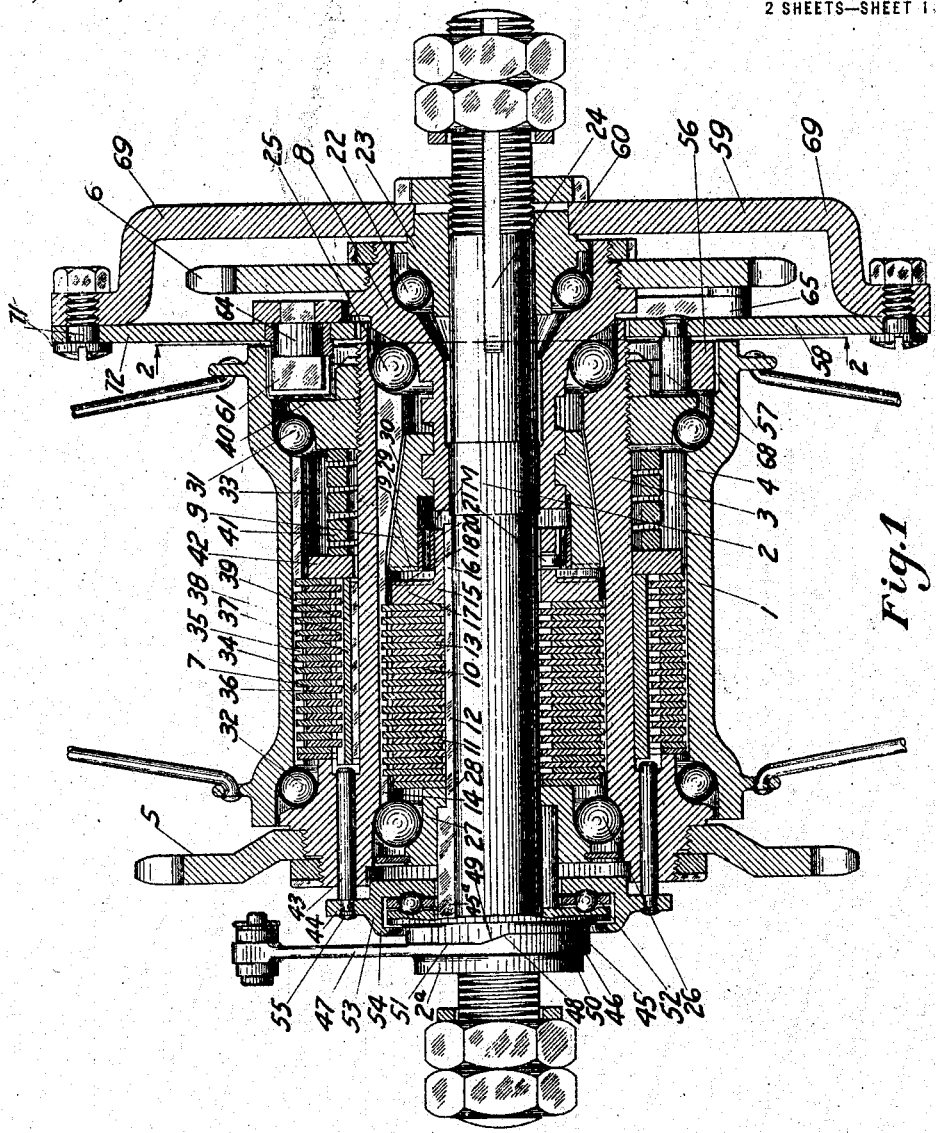

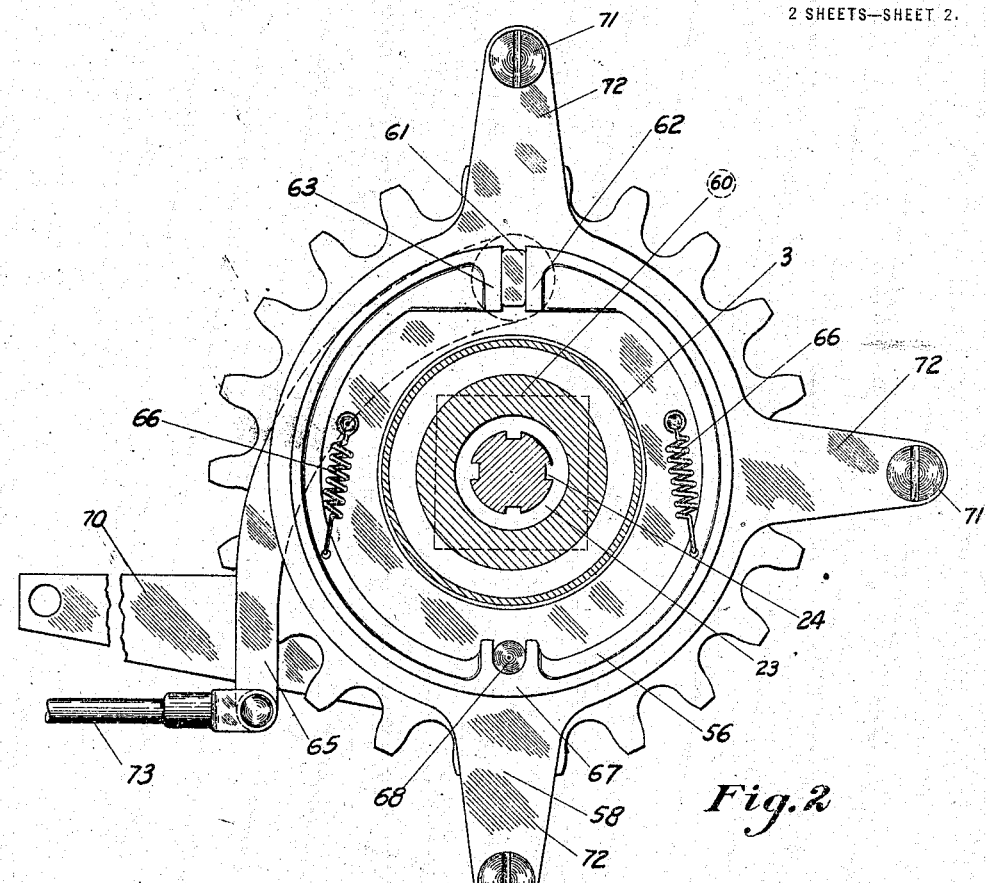
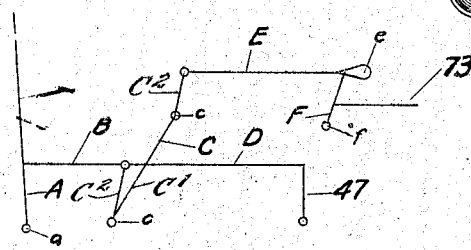
Fig. 3
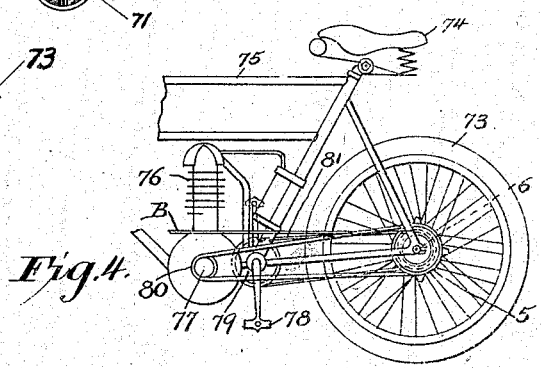
Fig. 4

VICTOR W. PAGÉ, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

PROPELLING AND CONTROLLING MECHANISM.

1,193,919.  Specification of Letters Patent.  Patented Aug. 8, 1916.

Application filed November 5, 1912. Serial No. 729,57:.

*To all whom it may concern:*

Be it known that I, VICTOR W. PAGÉ, a citizen of the United States, residing at Bristol, county of Hartford, State of Connecticut, have invented a certain new and useful Propelling and Controlling Mechanism, of which the following is a full, clear, and exact description, such as will enable others skilled in the art to which it appertains to make and use the same, reference being had to the accompanying drawings, forming part of this specification.

My invention relates to propelling and controlling mechanisms and, although not restricted to such use, has more particular reference to a hub or the like for motor cycles.

In driving hubs for motor cycles and the like, as heretofore constructed a difficulty has been that it has been impossible to run the engine or to crank and brake the same from the pedals without at the same time directly influencing the movement of the vehicle in which such hub was incorporated.

One object of my invention is to provide a device of the character indicated capable of easy adaptation to any of the usual forms of wheels, more particularly the driving wheel of a motor cycle, and which will permit of the running of the engine without the driving of the vehicle or of the pedals thereof, and will also permit of the cranking and braking of the engine from the pedals without driving or braking the vehicle.

Another object is to provide a hub which will permit of the vehicle being driven and braked from the pedals or to run free thereof and which will also permit of the engine being run free.

Another object is to provide a mechanism which, although strong, efficient and reliable, is comparatively inexpensive and is easily assembled.

Another object is to provide a mechanism which is simple in operation and whose parts are well protected and not liable to get out of order.

To these ends and also to improve generally upon devices of the character indicated, my invention consists in the various matters hereinafter described and claimed.

In the accompanying drawings: Figure 1 is a longitudinal diametrical section of a hub embodying my invention; Fig. 2 is a section substantially on the line 2—2 of Fig. 1 looking in the direction of the arrows and showing a face view of the brake carrier and the auxiliary brake supported thereon; Fig. 3 is a somewhat conventional view of a suitable means for actuating certain parts of the mechanism; and Fig. 4 is a fragmental, somewhat conventional view of a motorcycle with a hub embodying my invention incorporated therein.

The illustrated embodiment of my invention is a hub, designated generally as 1. This hub comprises an axle 2, an inner driven shell or intermediate driven and controlled member 3 and an outer spoke-carrying driving wheel-hub-shell, element or ultimate driven element 4 rotatable with respect to each other. The inner shell 3 carries the sprocket 5 serving as a means for connecting it with the engine, as 76, and corresponds to the usual hub-shell of a coasting, braking and driving hub, or coaster brake mechanism, the interior mechanism of such hub being designated generally as M. This inner shell may be driven or braked from the pedals 78 (Fig. 4) through the medium of the pedal-controlled sprocket 6, or may coast free of the pedals, as is usual in coaster brakes. The outer shell 4 is normally connected to the inner shell 3 to be driven, permitted to run free, and to be braked, as a unit with the inner shell, such connection being here effected by means of an optionally active clutch 7, but may run free of the inner shell when the clutch 7 is released. Thus, it will be seen that, in the illustrated device, the wheel (and the vehicle) may be driven from the engine through the sprocket 5 when the clutch 7 is actively operative, while the wheel (and vehicle) may run free of the engine when the clutch is released. When the pedal-driven sprocket 6 is connected with the inner shell 3 for driving, the engine may (due to the releasable clutch 7) be cranked from the pedals without disturbing the outer shell 4. When the inner shell 3 is released from pedal-sprocket 6 the engine can drive the inner shell, and, if desired, the outer shell, without actuating the pedals. When the brake of the coaster brake mechanism is applied from the pedals, the inner shell, and consequently the engine, may be braked from the pedals with or without affecting the outer shell (and the movement of the vehicle) depending upon whether the clutch 7 is actively engaged or is released.

I prefer to employ in connection with the intermediate means, here illustrated as the inner shell 3, a driving and coasting mechanism broadly of the type disclosed in Patent No. 745,524 granted December 1, 1903 to Albert F. Rockwell.

Referring more particularly to the drawings and to said patent, the inner shell 3 serves as a driver member which, considered only as an element of the driving and coasting mechanism, is a driven part, 8 is the threaded driver sleeve or driver rotatably mounted upon the before referred to axle 2 and carrying the before referred to sprocket 6, all, as thus far described, substantially as disclosed in said patent to Rockwell except that the intermediate means, shown as the "driver member" of the present hub stands in the place of the hub shell of Rockwell.

A connector, shown as a laterally shiftable sleeve 9 provided with interior threads which coact with the threads upon said driver sleeve, is provided, which connector, when moved in one direction acts to drive the part 3 and, when shifted sufficiently in the other direction actuates the brake.

Suitable braking means are provided, there being shown an interior brake 10 of the friction-disk type. Certain of the disks, as 11, are shown as slidably but non-rotatably attached to the axle 2 as by keying at 12, while the intermediate disks, as 13, are slidably and non-rotatably attached to the driver member, as by keying at 14.

A suitable connecting means between the laterally shiftable connector and the brake is provided. Such means may be a transfer element, here shown as the sleeve 15, slidably and non-rotatably attached to the axle, as by keying at 16. This sleeve 15 carries a flange 17 for braking engagement, when desired, with the innermost brake disk. I prefer to use such a flange as it provides a broad surface for the application of the braking force. Preferably the face of the flange is serrated as at 18, and these serrations coöperate with corresponding serrations 19 upon the connector 9 to provide an effective contact between the sleeve 15 and the connector to thereby arrest rotation of the connector.

If desired, a retarding spring 20 may be carried upon the sleeve 15 and in contact with the interior surface of the connector 9. The connection between the sleeve 15 and the spring 20 may be as indicated at 21.

The driver sleeve 8 is shown as carried upon antifriction members 22 whose cone member 23 may be non-rotatably attached to the axle as by being keyed thereto as indicated at 24. The inner shell 3 is conveniently carried at one end by antifriction members 25 supported upon the driver sleeve 8, and at the other end by antifriction members 26 whose cone member 27 may be non-rotatably attached to the axle as by being keyed thereto at 28.

Assuming that the laterally shiftable connector 9 is so related to the sleeve 15 that the shifting of the connector sufficiently to the left (in Fig. 1) causes it to apply the brake, it will be apparent that, when the sprocket wheel 6 is driven forwardly, it rotates said driver sleeve forwardly and thus causes said connector to travel to the right (on the threads of the driver sleeve) until the clutch face 29 of the connector engages the corresponding clutch face 30 of the driver member and causes the driver member to rotate; when the rider holds the pedals and the driver sleeve stationary, the rotating driver member causes the connector 9 to move to the left, breaking the before mentioned clutching engagement, whereupon the driver member 3 is free to coast; and when the driver sleeve is rocked backwardly, as by backward rocking of the pedals, said connector 9 is shifted to the left until, by the connection 15 to the brake, the brake is actuated.

The before mentioned outer shell 4 is supported, as by antifriction bearings 31 and 32, upon and about the inner shell 3 and is preferably spaced therefrom throughout a portion of its length as indicated at 33. Conveniently located within this space may be placed the before referred to clutch mechanism 7. I illustrate such clutch mechanism as comprising a series of friction disks certain of which, as the disks 34, are slidably and non-rotatably mounted relatively to the inner periphery of the wheel-hub 4, as by keying at 35. The intermediate disks 36 are shown as slidably and non-rotatably mounted upon a shiftable support or sleeve 37, as by keying at 38. The sleeve 37 is carried by the inner shell 3 and is non-rotatably and slidably connected thereto, as by keying at 39. By the construction recited a strong and efficient connection between the driver member 3 and the hub-shell 4 is provided.

Preferably the series of clutch disks (and sleeve 37) is of less length than the space 33, and is so situated as to leave a considerable space between the innermost clutch disk and the cone 40 of the antifriction bearing 31. In this space may be conveniently placed a means for normally holding the clutch disks in clutching engagement. I show such means as a resilient presser or spring 41, under compression, surrounding the driver member, and abutting at one end the cone 40. The other end of the spring is connected with the innermost clutch disk. This connection is here shown as effected by the annulus 42 disposed between the end of the spring and the innermost clutch disk. This abutment serves to effectively and evenly apply the pressure of the spring to the clutch disk.

Suitable releasing mechanism is preferably provided for releasing the clutch 7 in order that the driver member and the hub-shell may have independent rotative movement. In the illustrated structure there are provided the pins 43, conveniently carried by the driver member 3 and slidable therethrough to push the sleeve 37 toward the right as the parts are here illustrated. When these pins are moved inwardly, and thus compress the spring 41, the pressure between the disks is relieved thereby breaking the driving connection between the driver member 3 and the hub-shell 4.

The pins 43 conveniently carry the shifter or shift member therefor and here shown as the ring 44 rotatable about the axle. Suitable means, under the control of the rider, are provided for shifting this ring longitudinally of the shaft in order to correspondingly move the pins 43. As here shown this shift means embodies cam-plates 45 and 46, the plate 45 being keyed, as at 45$^a$, to the axle so as to be slidably and non-rotatably attached thereto and in coöperative relation with the ring 44 to move such ring longitudinally of the axle when the plate 45 is correspondingly moved, while the plate 46 can oscillate about the axle, being held from sliding thereon as by the shoulder 2$^a$ of the axle. The plate 46 carries the actuator or lever 47, under the control of the rider, for oscillating the plate. Plates 46 and 45 are shown as having coöperating inclined portions 48 and 49 respectively, and flat portions 50 and 51 respectively. In this construction initial movement of plate 46 shifts plate 45 but, after portion 48 has traversed portion 49, continued forward oscillation of plate 46 causes portion 50 to travel on portion 51 with no other effect than the holding of plate 45, and ring 44, in their inward position. Thus when the parts are as illustrated the pins 43 are retracted, the spring 41 is active, and the clutch 7 is effective, whereby movement of the driver member 3 is imparted to the hub-shell 4, but, when the cam-plate 46 is rocked, its face-cam forces the cam-plate 45 to slide along the axle thus correspondingly sliding the ring 44, whereby the pins 43, acting through the sleeve 37 compress the spring 41, thus releasing the clutch 7 and breaking the driving connection between the driver member 3 and the hub-shell 4.

To insure the free rotation of the ring 44, as its attched pins 43 are carried around by the driver member 3 I prefer to dispose a ball-thrust bearing 52 between the member 45 and the ring 44.

Preferably the ring 44 has a flange 53 extending over and protecting the ball-thrust bearing 52 and the member 45. This flange 53 is shown as, at its outer end, turned toward the axle, as indicated at 54, to hold the ring 44, the ball-thrust bearing 52, and the cam-plate 45 assembled with respect to each other, such inturned portion over-lapping the enlarged portion of the cam-plate 45, as shown. The ring 44 is shown as also having a flange 55 to which the pins 43 are conveniently attached.

In the structure above described, when the clutch 7 is released and the hub-shell 4 runs free, such shell is not under the control of the pedal-actuated brake and, therefore, I prefer to provide an auxiliary brake whereby such shell (and the vehicle) may be braked even when running free of the inner shell.

As here illustrated there is provided a generally annular expansible brake band 56 which is conveniently received within the end of the hub-shell 4 so that, when it is expanded, braking engagement will be effected between the inner surface 57 of the hub-shell and the band. The band is shown as suitably supported upon a carrier or circular armed plate 58 located between the sprocket 6 and the hub-shell. This plate may be conveniently carried by a support, anchor-member or spider plate 59 located at the outer side of the sprocket, and non-rotatably fitted to the cone 23 as by being squared thereon as indicated at 60.

The band may be expanded by any suitable means there being here illustrated a spreader in the character of a rectangular cam-block 61 located between the spaced ends 62 and 63 of the band and which, when partially rotated, acts to spread the band ends apart. The cam may be conveniently carried by the plate 58 by means of an oscillatively mounted stud 64. The stud is shown as provided with an actuator or lever 65 under the control of the rider.

The brake band may be carried upon the plate 58 by means of a plurality of strong springs 66, 66, and by means of the jawed lug 67 upon the inner periphery of the band, and a coöperating pin 68 upon the plate and between the jaws. The springs normally pull the base of the jaws into contact with the pin 68 and aid in holding the band away from the surface 57 but yet, when the band is spread, expand and permit the band, guided by the pin 68, to come into contact with the surface substantially throughout the length of the band.

Preferably the spider 59 has certain of its arms, as 69, 69, 69, formed to overlie the rim of the sprocket and be connected with the arms 72 of plate 58 as by the bolts 71, so that the plate 59 and the plate 58 coöperate to protect the sprocket from injury.

Another arm of the spider, as 70, may conveniently serve as an anchor arm for attachment to the frame of the vehicle. It will be seen that, with the plate 59 thus anchored, not only is the brake band anchored but, since the plate 59 is non-rotatably connected with the cone 23, and the cone 23, in turn, non-rotatably connected with the axle 2 and the disks 11 non-rotatably connected with the axle 2, both brakes and the axle are anchored to the vehicle by a single anchor arm.

In Fig. 3 is shown, somewhat conventionally, a common means for operating the clutch controlling lever 47 and the brake controlling lever 65. As shown the main operating lever A under the control of the rider and suitably pivoted to a stationary part of the vehicle frame at $a$, is connected by the link B to a lever C comprising the member $C^1$ and two arms $C^2$, $C^2$ all rigidly connected. This lever is carried by bearings $c, c,$ at the ends of the member $C^1$ and carried by a stationary part of the vehicle whereby the lever C is mounted for oscillation upon the axis of the member $C^1$. One of the arms is connected by the link D to the clutch releasing lever 47, and the other arm is connected by the link E to the lever F, suitably mounted at $f$, which in turn is connected to the link 73 attached to the auxiliary brake lever 65. As shown there is a lost motion connection $e$ between the link E and the lever F permitting lost motion between such parts during the initial movement of the link E.

The linkage above described is preferably so proportioned that the lost motion between the link E and the lever F continues until the inclined cam surface 48 has wholly traversed the inclined cam surface 49, and preferably until the flat surface 50 has ridden a short distance on the flat surface 51. Then, when the lost motion ceases and the lever F is moved and the brake is operated, the surface 50 continues to ride on the surface 51 so that, while the auxiliary brake is being applied the clutch 7 is held disengaged.

By the construction just described the disengagement of the hub-shell 4 from the engine before the applying of the auxiliary brake is assured. Thus the brake does not have to exert its force against the engine thus enabling the brake to exert all of its force against the hub, and also avoiding straining of the clutch 7 and other parts.

In Fig. 4 the hub 1 is illustrated as incorporated in the driving or traction wheel 73 of a motorcycle designated generally as 74. As is usual the frame 75 of the motorcycle carries both an engine, as 76, with its driving sprocket 77, and the pedals as 78, with their sprocket 79, the sprocket 77 being connected with the sprocket 5 of the hub 1 by the chain 80 and the sprocket 79 being connected with the sprocket 6 by the chain 81. With the hub 1 thus combined with the pedals 78 and the engine 76 it will be seen that even, and especially, with the wheel 73 stationary on the ground the engine can, by virtue of the releasing of clutch 7 and the consequent disconnection of the driver shell 3 and the wheel-hub-shell 4, be cranked from the pedals. Also, with the clutch 7 released, the engine can, by virtue of the pedal actuated brake 10 of the coaster brake mechanism, be braked from the pedals without retarding the rotation of the wheel 73 and the forward travel of the motorcycle.

It will be seen that I have provided a hub which can be laced into any of the common types of wheels, which embraces a driving, coasting and braking mechanism, which permits of the engine being cranked while the hub-shell (and the wheel) is unaffected by the pedals (as stationary), which permits of the engine being braked from the pedals without braking the vehicle, which permits of the hub-shell (and the wheel) being braked without braking the engine, and which withal is strong, easily assembled and comparatively inexpensive to manufacture, whose parts are well protected, and which is positive and efficient in operation.

Having thus described my invention, what I claim as new and desire to secure by Letters Patent is:

1. In a device of the character indicated, an ultimate driven element, an intermediate driven member, means for connecting said member with a prime mover to drive the prime mover, means for connecting said element with said prime mover to be driven thereby, and means for driving said member; said member and said element being arranged for independent movement, whereby said prime mover can be driven through said driving means, said member and said first named connecting means without driving said element; substantially as described.

2. In a device of the character indicated, an ultimate driven element, an intermediate controlled member, means for connecting said member with a prime mover to control the prime mover, means for connecting said element with said prime mover to be driven thereby, a brake for said member, and means for actuating said brake; said member and said element being arranged for independent control, whereby said prime mover can be braked through said actuating means, said brake, said member and said first named connecting means without braking said element; substantially as described.

3. In a device of the character indicated, an ultimate driven element, an intermediate driven and controlled member, means for connecting said member with a prime mover to drive and control the prime mover, means for connecting said element with said prime mover to be driven thereby, a brake for said member, and means for driving said member and for actuating said brake; said member and said element being arranged for independent movement and control, whereby said prime mover can be driven and braked through said last named means, said member, said brake and said first named connecting means without driving or braking said element; substantially as described.

4. In a cycle, the combination with a spoke-carrying wheel-hub and an engine for driving the same, of mechanism received within said hub whereby said engine can be driven independently of said hub; substantially as described.

5. In a cycle, the combination with a spoke-carrying wheel-hub and an engine for driving the same, of mechanism received within said hub whereby said engine can be braked independently of said hub; substantially as described.

6. In a cycle, the combination with a spoke-carrying wheel-hub and an engine for driving the same, of mechanism received within said hub whereby said engine can be driven and braked independently of said hub; substantially as described.

7. In a cycle, in combination, a spoke-carrying wheel-hub, an engine for driving the same, mechanism including means for driving the engine and means whereby the driving can be independent of the hub, an axle, and means for holding the hub and the mechanism assembled upon the axle; substantially as described.

8. In a cycle, in combination, a spoke-carrying wheel-hub, an engine for driving the same, mechanism including means for braking the engine and means whereby the braking can be independent of the hub, an axle, and means for holding the hub and the mechanism assembled upon the axle; substantially as described.

9. In a cycle, in combination, a spoke-carrying wheel-hub, an engine for driving the same, mechanism including means for driving and braking the engine and means whereby such actions can be independent of the hub, an axle, and means for holding the hub and the mechanism assembled upon the axle; substantially as described.

10. A cycle hub comprising an axle, a driven member and a spoke-carrying element carried by said axle, means for connecting said member with an engine to drive the engine, means for connecting said element with said engine to be driven by said engine, and means for driving said member; said member and said element being arranged for independent movement, whereby said engine can be cranked through said driving means, said member and said first named connecting means without driving said element; substantially as described.

11. A cycle hub comprising an axle, a member to be braked and a spoke-carrying element carried by said axle, means for connecting said member with an engine to control the engine, means for connecting said element with said engine to be driven by said engine, a brake for said member, and means for actuating said brake; said member and said element being arranged for independent control, whereby said engine can be braked through said brake actuating means, said brake, said member and said first named connecting means without braking said element; substantially as described.

12. A cycle hub comprising an axle, a member to be driven and braked and a spoke-carrying element carried by said axle, means for connecting said member with an engine to drive and control the engine, means for connecting said element with said engine to be driven by said engine, a brake for said member, and means for driving said member and for actuating said brake; said member and said element being arranged for independent movement and control, whereby said engine can be cranked and braked through said driving and actuating means, said brake, said member and said first named connecting means without driving or braking said element; substantially as described.

13. A cycle hub comprising an axle, a driven member and a spoke-carrying element carried by said axle for independent rotation thereabout, means for connecting said member with an engine to drive the engine or to be driven thereby, a driving connection between said member and said element, and means for driving said member; said driving connection being optionally active, whereby, when said connection is inactive, said engine can be cranked through said driving means, said member and said connecting means without driving said element; substantially as described.

14. A cycle hub comprising an axle, a member to be braked and a spoke-carrying element carried by said axle for independent rotation thereabout, means for connecting said member with an engine to be driven by the engine or to control the engine, a driving connection between said member and said element, a brake for said member, and means for actuating said brake; said driving connection being optionally active, whereby, when said connection is inactive, said engine can be braked through said actuating means, said brake, said member and said connecting means without braking said element; substantially as described.

15. A cycle hub comprising an axle, a member to be driven and braked and a spoke-carrying element carried by said axle for independent rotation thereabout, means for connecting said member to an engine to drive and control the engine or to be driven thereby, a driving connection between said member and said element, a brake for said member, and means for driving said member and for actuating said brake; said driving connection being optionally active, whereby, when said connection is inactive said engine can be cranked and braked through said driving and actuating means, said brake, said member and said connecting means without driving or braking said element; substantially as described.

16. In a cycle hub, an axle, a rotatable driven inner shell and means for driving it both carried by said axle, an outer spoke-carrying hub-shell carried by said inner shell, and means for connecting said two shells and whereby said outer shell is driven as a unit with said inner driven shell; substantially as described.

17. In a cycle hub, an axle, a rotatable inner shell to be driven, to run free, and to be braked, means for driving said shell, permitting it to run free, and for braking said shell, said shell and said means being carried by said axle, an outer spoke-carrying hub-shell carried by said inner shell, and means for connecting said two shells and whereby said outer shell is driven, permitted to run free, and braked, as a unit with said inner shell; substantially as described.

18. In a cycle hub, the combination with a driving mechanism; such mechanism including an inner shell and means for driving said shell; of a spoke-carrying shell carried by said inner shell for independent rotation thereabout; means for connecting said inner-shell with an engine for control thereby and thereof, and an optionally active driving connection between said two shells; substantially as described.

19. In a cycle hub, the combination with a braking mechanism; such mechanism including an inner shell, a brake for said shell, and means for applying said brake; of a spoke-carrying shell carried by said inner shell for independent rotation thereabout, means for connecting said inner shell with an engine for control thereby and thereof, and an optionally active driving connection between said shells; substantially as described.

20. In a cycle hub, the combination with a driving and braking mechanism; such mechanism including an inner shell, a brake for said shell, and means for driving said shell and for applying said brake; of a spoke-carrying shell carried by said inner shell for independent rotation thereabout, means for connecting said inner shell with an engine for control thereby and thereof, and an optionally active driving connection between said two shells; substantially as described.

21. In a cycle hub, the combination with a coaster brake mechanism, such mechanism including an inner shell, a brake for said shell, means for driving said shell and for applying said brake, and means whereby said driving and brake-applying means can drive said shell, permit said shell to run free, and apply said brake; of a spoke-carrying shell carried by said inner shell for independent rotation thereabout, means for connecting said inner shell with an engine for control thereby and thereof, and an optionally active driving connection between said two shells; substantially as described.

22. In a device of the character indicated, the combination of a wheel-hub, means adapted for connection with an engine to drive the hub; there being a releasable connection between said means and said hub; a brake for said hub, and a common means for actuating said brake and releasing the connection between said first named means and said hub; substantially as described.

23. In a device of the character indicated, the combination of a wheel-hub, means adapted for connection with an engine to drive the hub, there being a releasable connection between said means and said hub; a brake for said hub, and a common means for first releasing said connection and then actuating said brake; substantially as described.

24. In a device of the character indicated, a driving means, a member to be driven thereby, a releasable clutch for connecting said means and member, a brake for said member and means for releasing said clutch and applying said brake; said means comprising releasing means for the clutch including coöperating cams formed with inclined portions by the relative movement of which the clutch is released and with other portions by whose contact the clutch is held released, means for operating the brake, and a common means for relatively moving the cams and actuating the brake actuating means, there being a lost-motion connection between the common means and the brake actuating means and effective during the relative movement of the inclined portions of said cams and ineffective during the contact of the said other portions of said cams; substantially as described.

25. In a device of the character indicated, a wheel-hub-shell, a driving and braking mechanism, said mechanism including a shell adapted for connection with a plurality of driving means, and a brake for such shell; an optionally active connection between said shells, said hub-shell being capable of rotation independently of the other shell when said connection is inactive, a brake for said hub-shell, and a common means for anchoring both brakes; substantially as described.

26. In a device of the character indicated, a wheel-hub-shell, a driving and braking mechanism; said mechanism including a shell adapted for connection with a plurality of driving means, and a brake for such shell; an axle, said brake having parts anchored to said axle, an optionally active connection between said shells, said hub-shell being capable of rotation independently of the other shell when said connection is inactive, a brake for said hub-shell, and a common means for anchoring said second named brake and said axle whereby such means anchors both brakes; substantially as described.

27. In a motorcycle or the like, a frame, a plurality of driving means carried by said frame, an axle also carried by said frame, a driving wheel-hub-shell carried by said axle, a rotatable driver shell carried by said axle, operative connections between said driver shell and said plurality of driving means, a releasable driving connection between said shells, said shells both being capable of continuous rotation about said axle independently of each other when said driving connection is released, one of said operative connections including a driving element for rotating said driver shell, a brake for said hub shell, and a common means for anchoring and supporting said brake and for protecting said driving element; substantially as described.

28. In a device of the character indicated, a movable member provided with a braking surface, a brake coöperating with said braking surface, a driving sprocket for said member, and means for anchoring and supporting said brake and protecting said sprocket comprising a carrier for said brake upon the one side of said sprocket and to which said brake is attached, and an anchor member upon the other side of said sprocket; portions of said anchor member projecting beyond the rim of said sprocket and supporting the carrier and another portion being formed to serve as an anchor arm; substantially as described.

29. In a motorcycle or the like, a frame, a plurality of driving means carried by said frame, an axle also carried by said frame, a driving wheel-hub-shell carried by said axle and provided with a braking surface, a rotatable driver shell carried by said axle, operative connections between said driver shell and said plurality of driving means, a releasable driving connection between said shells, said shells both being capable of continuous rotation about said axle independently of each other when said driving connection is released, an expansible brake for said hub-shell, and means for holding said brake from braking contact and permitting said brake when expanded to contact substantially throughout its length with said surface; substantially as described.

30. In a device of the character indicated, an axle, a driving mechanism carried by said axle and including a rotatable shell adapted for connection with a plurality of driving means, a wheel-hub-shell rotatably carried by said first named shell, a releasable clutch between said shells, and means for releasing the clutch comprising a cam member having an outstanding portion, a shift member and a thrust member disposed between and connecting said cam and shift members, said shift member being provided with a portion overhanging said outstanding portion and inturned relative thereto whereby to hold the cam member, the thrust member and the shift member assembled; substantially as described.

In testimony whereof, I hereunto affix my signature, in the presence of two witnesses.

VICTOR W. PAGÉ.

Witnesses:
HAROLD A. KINGSBURY,
FREDERICK A. HOTCHKISS.